Patented Aug. 22, 1933

1,924,065

UNITED STATES PATENT OFFICE 1,924,065

PROCESS OF MAKING ZINC META ARSENITE

Leo P. Curtin, Cranbury, N. J.

No Drawing. Application April 23, 1932
Serial No. 607,228

5 Claims. (Cl. 23—53)

This invention relates to the preparation of zinc meta arsenite and is particularly concerned with the economical production of the compound in a state of high purity.

Zinc and arsenous acid are capable of forming two salts, the meta arsenite and the ortho arsenite. The latter is readily made by the interaction of a soluble zinc salt, such as zinc chloride, with a soluble compound of arsenous acid, such as sodium arsenite. When ordinary solutions of these two salts are mixed, giving a reaction mixture which is substantially neutral or alkaline, a precipitate of the normal or basic zinc ortho arsenite is produced. Zinc ortho arsenite has the disadvantages, as compared with the meta arsenite, in use as an insecticide, that it is decidedly less toxic to insects and that it is more readily decomposed by the action of atmospheric carbon dioxid or carbonic acid liberating ortho arsenous acid which burns the foliage. Consequently the meta arsenite is much more desirable and valuable of the two compounds as an insecticide, but heretofore it has not been used for that purpose on a commercial scale on account of the difficulty of manufacturing it in a state of suitable purity. Previous attempts to manufacture it have yielded products so contaminated with ortho arsenite or free arsenous acid as to render them unfit for use. The present invention provides a simple and economical method of making a zinc meta arsenite product of a purity of 99.5% or higher up to 99.9%. The product is obtained at a high yield and moderate cost and in a desirable physical form, i. e. as an exceedingly fine powder not requiring any grinding.

It has long been known that zinc meta arsenite could be produced by the interaction of a soluble salt of zinc and a soluble arsenite, provided that the hydrogen ion concentration of the reaction mixture was maintained within certain narrow limits, but heretofore no simple and economical method suitable for commercial operation for controlling the hydrogen ion concentration has been devised.

My invention therefore resides in a method for the control of the desired hydrogen ion concentration of the reaction mixture or in a method of making the meta arsenite involving such control of the hydrogen ion concentration. At the appropriate hydrogen ion concentration, which is in the neighborhood of that corresponding to a pH valve of from 5.5 to 6.5, zinc meta arsenite is the only stable compound of zinc and arsenous acid, and if, for instance, zinc oxid and arsenous acid, or zinc ortho arsenite and arsenous acid are mixed in proper proportion to form zinc meta arsenite in a medium maintained at said hydrogen ion concentration, part or all of these materials will react to the formation of the meta arsenite. It is, however, not practicable to manufacture the meta arsenite in this way due to the difficulty of controlling the hydrogen ion concentration and of obtaining complete conversion of the starting materials.

My preferred method for obtaining and maintaining the desired hydrogen ion concentration in the reaction medium and securing complete reaction of the reagents is as follows: A soluble zinc salt such as the sulfate is dissolved in water and slightly acidified; for example, 285 parts by weight of zinc sulfate $ZnSO_4.7H_2O$ and 2 parts by weight of glacial acetic acid are dissolved in about 1700 parts by weight of water. Another solution is prepared by dissolving 215 parts by weight of arsenous oxid ($As_2O_3$) and about 10 parts by weight of sodium carbonate in water as described in my United States Letters Patent No. 1,785,074, i. e. by boiling the mixture, using sufficient water, i. e. about 2000 to 4000 parts by weight of water to produce a solution of about 5 to 10%. The solution is cooled to below 50° C. and 90 parts by weight of sodium carbonate are added and dissolved in it. The two solutions are then mixed by pouring the arsenous oxid solution into the zinc sulfate solution slowly with good agitation. The solutions preferably are mixed hot and the mixture is allowed to stand at a temperature of 80 to 100° C. for several hours. The resulting precipitate of zinc meta arsenite is then separated by filtration or decantation and washed and dried. The mother liquor may be used for the preparation of a new solution of zinc sulfate repeatedly until it becomes saturated with sodium sulfate.

The zinc meta arsenite product is, as stated above, of very high purity and in a state of fine subdivision consisting of crystals of microscopic size. It is snow white in color.

The chemical reactions involved are believed to be accurately represented by the equation $$ZnSO_4 + As_2O_3 + Na_2CO_3 \rightarrow Zn(AsO_2)_2 + Na_2SO_4 + CO_2$$

The carbonic acid or carbon dioxid liberated by the reaction serves to keep the reaction mixture at the desired hydrogen ion concentration. An addition of sodium acetate to the reaction mixture also is useful for this purpose; for instance, an addition in the foregoing example of about 2 parts by weight of sodium acetate.

The acetic acid added to the zinc sulfate solution serves to prevent an initial precipitation of zinc ortho arsenite upon the addition thereto of the arsenous oxid solution.

It will be apparent that certain modifications in the specific procedure described may be made without departing from my invention. For instance, it is not necessary to adhere to the precise quantities and proportions of reagents mentioned and other equivalent reagents may be substituted for them. The zinc sulfate may be replaced by zinc chloride or acetate or other suitable salt, acids other than acetic acid may be used for acidifying the zinc salt solution, and alkalies other than sodium carbonate, such as the bicarbonate, sodium hydroxid or the corresponding potassium compounds, or even sodium or potassium arsenite, may be used in dissolving the arsenous oxid.

An important feature of the process is that the hydrogen ion concentration suitable for the formation of the meta arsenite is maintained in the reaction mixture by the presence therein of an excess of carbonic acid. This carbonic acid is supplied as has been described by the reagents themselves, i. e. by the use of sodium carbonate in the arsenous oxid solution which reacts with the liberation of carbonic acid. Sodium bicarbonate may be regarded as an equivalent agent. It is noted in this connection that the sodium carbonate or bicarbonate is dissolved in the arsenous oxid solution at a low temperature in order to avoid the liberation and loss of carbon dioxid at this point due to the interaction of the dissolved arsenous oxid or acid with the carbonate or bicarbonate salt.

It will be appreciated, therefore, that my invention resides in the precipitation of zinc meta arsenite by the interaction of a soluble zinc salt and a solution of arsenous acid or a salt thereof in a reaction mixture which is maintained at a hydrogen ion concentration capable of permitting the formation of the meta arsenite while preventing the formation of the ortho arsenite by the presence of carbonic acid. This carbonic acid conceivably might be supplied in other ways than by liberation thereof by interaction of reagents within the reaction mixture as, for example, by bubbling carbon dioxid into the reaction mixture.

The zinc meta arsenite product is valuable for use as an insecticide or fungicide, e. g. by dusting or by spraying liquid suspensions thereof, or for impregnating of fibrous masses such as paper, wallboard and the like.

This application contains subject matter in common with my application Serial No. 462,941, filed June 21, 1930.

I claim:

1. Method of preparing zinc meta arsenite which comprises reacting a soluble zinc salt and a soluble compound of arsenous acid in a reaction mixture maintained at a hydrogen ion concentration permitting the formation of the meta arsenite but preventing the formation of the ortho arsenite by the presence of carbonic acid.

2. Method of preparing zinc meta arsenite as defined in claim 1 in which the zinc salt and the compound of arsenous acid are reacted in an aqueous reaction mixture containing a soluble carbonate and saturated with carbonic acid.

3. Method of preparing zinc meta arsenite as defined in claim 1 in which a solution of the soluble compound of arsenous acid containing a soluble carbonate is slowly added to an acidified solution of the zinc salt.

4. Method of preparing zinc meta arsenite which comprises mixing a solution of arsenous oxid and alkali metal carbonate in water with an acidified aqueous solution of a zinc salt the quantity of alkali metal carbonate in said arsenous oxid solution being sufficient to saturate the reaction mixture with carbonic acid but insufficient to raise the pH value of the reaction mixture above about 6.5.

5. Method of preparing zinc meta arsenite as defined in claim 4 in which the zinc salt solution is acidified with acetic acid.

LEO P. CURTIN.